(12) United States Patent
Cirella

(10) Patent No.: US 6,892,823 B2
(45) Date of Patent: May 17, 2005

(54) POGO PLANTER

(76) Inventor: Salvatore Cirella, 56 E. Mall Dr., Melville, NY (US) 11747

(*) Notice: Subject to any disclaimer, the term of this patent is extended or adjusted under 35 U.S.C. 154(b) by 0 days.

(21) Appl. No.: 10/837,578

(22) Filed: May 4, 2004

(65) Prior Publication Data

US 2005/0045349 A1 Mar. 3, 2005

Related U.S. Application Data

(60) Provisional application No. 60/498,357, filed on Aug. 28, 2003.

(51) Int. Cl.[7] ............................. A01B 1/00; A01C 5/02
(52) U.S. Cl. ..................................... 172/371; 111/106
(58) Field of Search .................. 172/15–22, 371–378; 111/106, 107; 294/50.8, 50.9; 30/276, 277

(56) References Cited

U.S. PATENT DOCUMENTS

| | | | |
|---|---|---|---|
| D35,242 S | 10/1901 | Solomon | |
| D56,054 S | 8/1920 | Dlacich | |
| D60,259 S | 1/1922 | Plantinga | |
| 2,207,741 A | 7/1940 | Kimble | |
| 2,228,275 A | 1/1941 | Lawrence | |
| 3,226,149 A | 12/1965 | McJohnson | |
| 3,838,739 A | 10/1974 | Pollard | |
| D247,091 S | 1/1978 | Sandorf | |
| 4,123,980 A | 11/1978 | Winston | |
| 4,247,141 A | 1/1981 | Grint | |
| D262,596 S | 1/1982 | Green | |
| 4,466,188 A * | 8/1984 | Svendsgaard | ................ 30/172 |
| D297,605 S | 9/1988 | Weitekamp | |
| 5,080,027 A | 1/1992 | Brothers | |
| 5,109,930 A | 5/1992 | Napier | |
| 5,156,101 A * | 10/1992 | Wien | ........................ 111/101 |
| D332,555 S | 1/1993 | Hagerman | |
| 5,228,400 A | 7/1993 | Luke | |
| D339,038 S | 9/1993 | Pohlmann | |
| D344,221 S | 2/1994 | Allbright | |
| D349,223 S | 8/1994 | Nyffeler | |
| 5,492,070 A | 2/1996 | Lefkow | |
| D379,141 S | 5/1997 | Cleghorn | |
| D383,951 S | 9/1997 | Dutchak | |
| 5,669,649 A | 9/1997 | Metcalf | |
| 5,887,920 A | 3/1999 | Perciful | |
| 5,951,077 A | 9/1999 | Dahill | |
| 6,047,651 A | 4/2000 | Wilson | |
| D431,980 S | 10/2000 | Yarbrough | |
| 6,138,589 A * | 10/2000 | Miller et al. | ................ 111/106 |
| 6,386,294 B1 | 5/2002 | Best | |

FOREIGN PATENT DOCUMENTS

| | | |
|---|---|---|
| JP | 10-234205 | 9/1998 |
| WO | WO 02/051239 | 7/2002 |

* cited by examiner

Primary Examiner—Robert E Pezzuto
(74) Attorney, Agent, or Firm—Richard C. Litman

(57) ABSTRACT

The planting tool has an elongated shaft, a T-shaped rubber gripped handlebar attached to the upper end of the shaft, and an earth separating member attached to the lower end of the shaft. The earth separating member is a hollow, triangular body formed by opposing triangular plates maintained in spaced apart relation by edge plates around the periphery. The triangular plates are preferably isosceles triangles, the shaft bisecting the base, the vertex opposite the base pointing downward. In use, the triangular body is pressed into aerated soil to form a V-shaped plating hole, and may be rotated 180° to form a conical hole.

6 Claims, 3 Drawing Sheets

POGO PLANTER

CROSS-REFERENCE TO RELATED APPLICATION

This application claims the benefit of U.S. Provisional Patent Application Ser. No. 60/498,357, filed Aug. 28, 2003.

BACKGROUND OF THE INVENTION

1. Field of the Invention

The present invention relates to garden tools, and especially to a ground hole-creating device used to create openings for plant annuals. The tool can be forced into the ground using both hand and foot pressure.

2. Description of the Related Art

Gardeners and those who like to plant annuals have to undergo the task of planting the plugs in the soil each year. The task is usually compounded by the fact that annuals are usually planted in bulk. The task of planting annuals involves preparing the soil and creating holes for each plug. The traditional way of creating an annual bed is by getting down on one's knees with hand tools to form a hole and plant each plug individually. Unfortunately, this process can cause back and knee pain, and also does not provide the planter with a perspective view of the developing bed of annuals. Annual beds are usually planted in staggered rows, thus it is important for the planter to see the bed in perspective during the process of planting the plugs. Consequently a digging or earth moving tool which may be used standing up, which does not require repetitive digging passes to prepare a single planting hole, and which is particularly dimensioned for forming a planting hole particularly adapted for planting annual plugs is desired.

Gardening is such a popular pastime that a plethora of devices have been devised, both for general gardening tasks and for particular purposes.

A number of devices have been designed in which the digging or earth-moving component comprises a thin plate or blade. The plate may be flat and planar, or arcuately curved. Various ornamental designs for hoes are shown in U.S. Design Patent Nos. 35,242, issued Oct. 29, 1901 to Solomon; 60,259, issued Jan. 17, 1922 to Plantinga; 344,221, issued Feb. 15, 1994 to Allbright; 379,141, issued May 13, 1997 to Cleghorn; 383,951, issued Sep. 23, 1997 to Dutchak; and 431,980, issued Oct. 17, 2000 to Yarbrough.

Various forms of spades or shovels are shown or described in U.S. Des. Pat. No. 332,555, issued Jan. 19, 1993 to Hagerman; U.S. Design Patent No. 339,038, issued Sep. 7, 1993 to Pohlmann; U.S. Pat. No. 3,226,149, issued Dec. 28, 1965 to McJohnson; U.S. Pat. No. 4,247,141, issued Jan. 27, 1981 to Grint; U.S. Pat. No. 5,669,649, issued Sep. 23, 1997 to Metcalf; U.S. Pat. No. 5,887,920, issued Mar. 30, 1999 to Perciful; and U.S. Pat. No. 5,951,077 to Dahill.

Other gardening devices having a single, flat plate digging element are disclosed in U.S. Des. Pat. No. 56,054, issued Aug. 10, 1920 to Dlacich (a pick); U.S. Des. Pat. No. 247,091, issued Jan. 31, 1978 to Sandorf (hand tool); U.S. Des. Pat. No. 262,596, issued Jan. 12, 1982 to Green (a wheeled garden tool); U.S. Des. Pat. No. 349,223, issued Aug. 2, 1994 to Nyffeler (a garden tool); U.S. Pat. No. 2,228,275, issued Jan. 14, 1941 to Lawrence (cutters and trowels); and U.S. Pat. No. 4,123,980, issued Nov. 7, 1978 to Winston (root feeder with shovel-like digging element).

Still other devices have a digging or earth moving element with a special shape for specialized tasks. Tools having a conically shaped element are shown in U.S. Pat. No. 2,207,741, issued Jul. 6, 1940 to Kimble; U.S. Pat. No. 5,228,400, issued Jul. 20, 1993, issued to Luke; and W.I.P.O. Patent No. WO 02/051239, published Jul. 4, 2002. Tools having a cylindrical digging element are taught in U.S. Pat. No. 3,838,739, issued Oct. 1, 1974 to Pollard (tube with pointed end); U.S. Pat. No. 5,080,027, issued Jan. 14, 1992 to Brothers (pole with pointed end for seed planting); and U.S. Pat. No. 6,386,294, issued May 14, 2002 to Best; and Japanese Patent No. 10-234,205 published Sep. 8, 1998 (shovel and fork hinged together to form cylinder). Devices with a rectangular box shape are described in U.S. Pat. No. 5,492,070, issued Feb. 20, 1996 to Lefkow; and U.S. Pat. No. 6,047,651, issued Apr. 11, 2000 to Wilson (inverted frusto-pyramidal).

In addition, U.S. Des. Pat. No. 297,605, issued Sep. 13, 1988 to Weitekamp shows a garden tool with three plates defining an inverted U-shape, open on one side, and U.S. Pat. No. 5,109,930, issued May 3, 1992 to Napier shows an earth splitter having a wedge-shaped blade with two rectangular faces, the edges being generally triangular faces.

None of the above inventions and patents, taken either singly or in combination, is seen to describe the instant invention as claimed. Thus a planting tool solving the aforementioned problems is desired.

SUMMARY OF THE INVENTION

The planting tool of the present invention is particularly designed for use in planting annuals, which are available from nurseries and garden centers in the form of plugs. The planting tool has an elongated, tubular shaft with a T-shaped rubber gripped handle at one end and a earth separating member at the other end. The earth separating member is formed by two triangular plates joined by rectangular edge plates which maintain the triangular plates in spaced apart relation, defining a hollow, enclosed, triangular earth separating member. The earth separating member is attached to the bottom end of the shaft with a vertex of the triangle pointing downward for penetrating the ground, the base of the triangle permitting the application of foot pressure to the earth separating member.

In use, the gardener grasps the T-shaped rubber gripped handle and presses the earth separating member into the ground (preferably, previously aerated to improve drainage and friability) using both hand and foot pressure while standing. The planting tool is dimensioned so that the tool initially forms a V-shaped furrow of a depth and width adequate for planting most annuals, such as impatiens, begonias, etc. If the root ball has a diameter which is too large for the initially created furrow, the planting tool may be rotated 180° in the furrow to form a conical planting hole large enough to accommodate the roots of the plug.

The tool is lightweight due to the tubular construction, and allows the user to quickly create several openings in the ground while standing up. By allowing the gardener to create holes while standing, the user gains the perspective needed to create staggered rows and continuity in an annual bed. Most annual beds consist of staggered rows of annuals to create an aesthetically pleasing effect. The traditional way of planting annuals is by kneeling on the ground and bending over to create each opening with hand tools. The present planting tool prevents the user from having to bend or kneel to plant the plugs eliminating back and joint pain that is caused by planting annuals the traditional way. The present tool also allows the user to use both hand and foot pressure to create a hole in the ground. The width of the planting tool permits the formation of a planting hole of the appropriate size faster than a flat bladed hoe or spade.

Accordingly, it is a principal object of the invention to provide a planting tool having an inverted, hollow, triangular earth separating member that creates a planting hole specifically designed for the size of an annual plug.

It is another object of the invention to provide a planting tool having an inverted, hollow, triangular earth separating member that can create a conical planting hole by twisting the device 180° when in the ground.

It is a further object of the invention to provide a planting tool that is lightweight and can be driven into the ground using both hand and foot pressure.

Still another object of the invention is to provide a planting tool for annuals that allows the user to stand up while forming a planting hole for annuals in order to gain perspective and continuity for planting the annuals in staggered rows.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
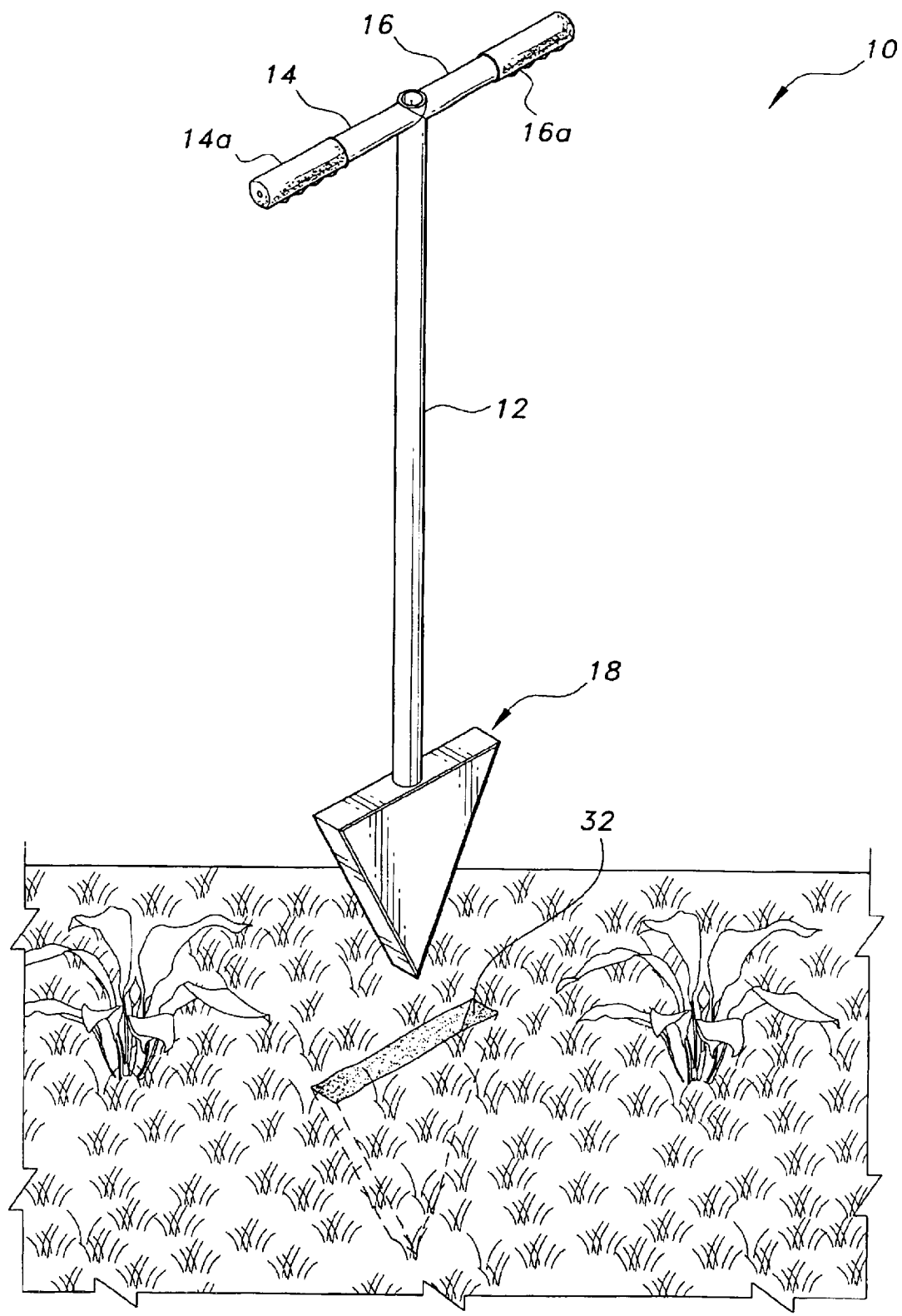
FIG. 1 is an environmental, perspective view of a planting tool according to the present invention.
Figure 2:
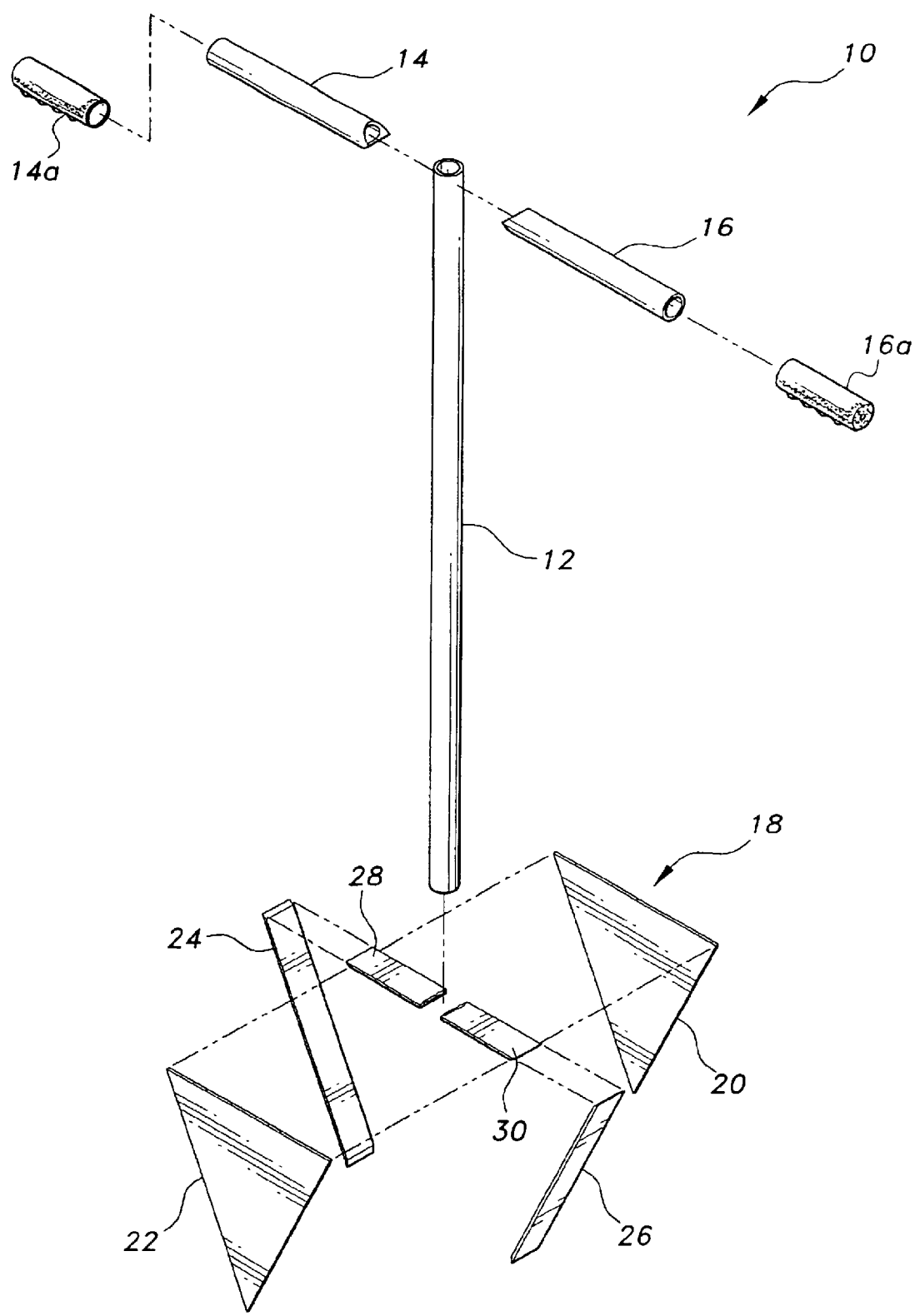
FIG. 2 is an exploded view of the planting tool according to the present invention.
Figure 3:
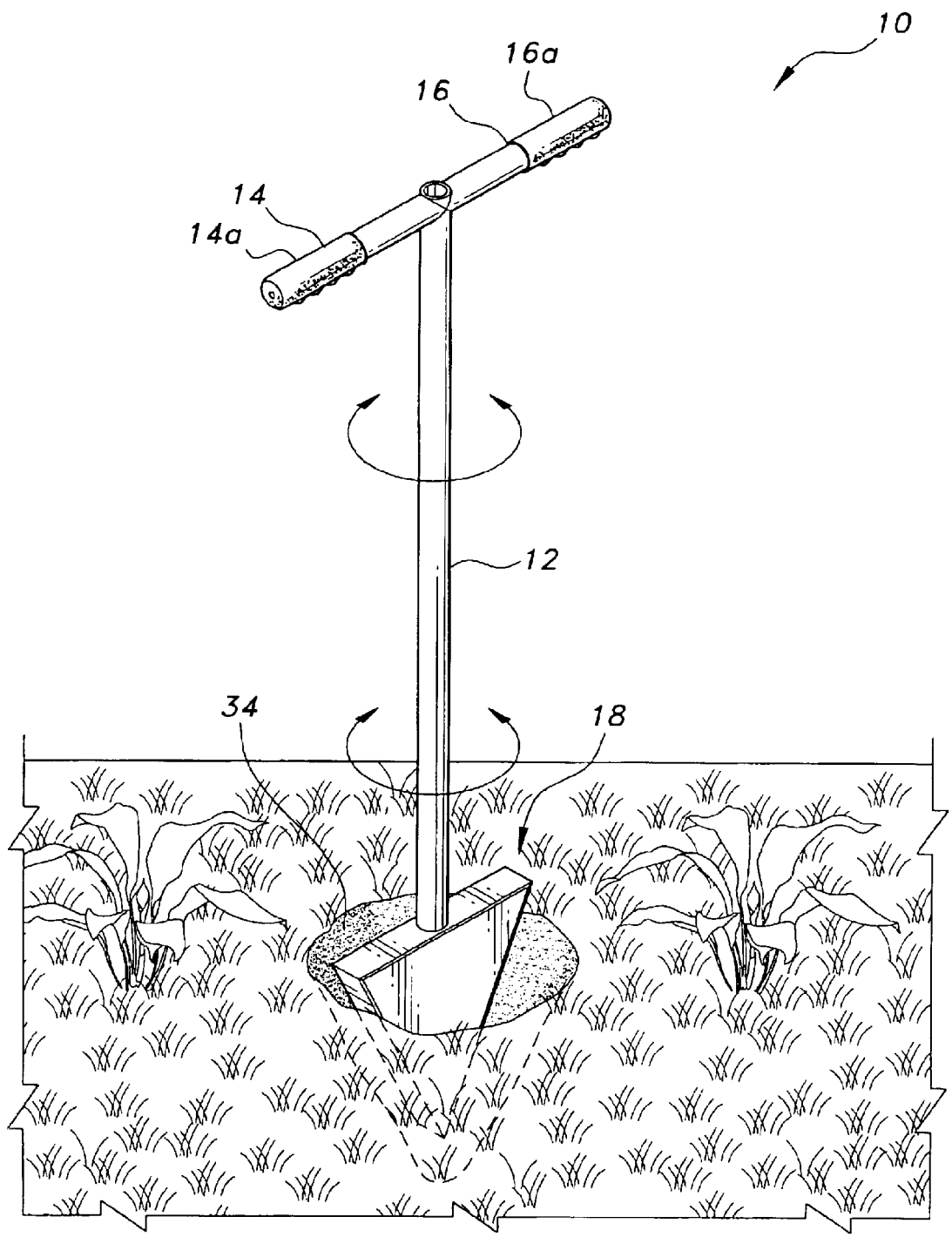
FIG. 3 is a second environmental, perspective view of a planting tool according to the present invention, showing the tool being used to create a conical hole.

The present invention is a planting tool, designated generally as 10 in the drawings, as shown in FIGS. 1–3. The planting tool 10 is used to create a "V" shaped openings in the ground 32, as shown in FIG. 1, to plant annuals, and conical holes in the ground 34, as shown in FIG. 3, to plant potted plants and the like. Referring first to the exploded view of the planting tool 10 in FIG. 2. The planting tool 10 is made from pipes and plates. Preferably, the tool 10 is constructed of lightweight steel. The planting tool 10 has an elongated shaft 12 having upper and lower ends. The shaft 12 is hollow and tubular.

A handlebar 14, 16 is secured to the upper end of the elongated shaft 12. The shaft 12 is secured at the midpoint of the handlebar 14, 16, defining a T-shaped handle at the upper end. The handlebar can consist of two units, a left unit 14 and a right unit 16, as seen in FIG. 2, or it can be a single pipe with a T-fitting for attachment to the shaft 12. The handlebar 14, 16 has rubber grips 14a, 16a to allow the user to comfortably place hand pressure on the planting tool.

An earth separating member 18 is attached to the lower end of the shaft 12. The earth separating member 18 takes the form of a hollow, triangular body constructed of plates, including a first triangle face plate 20, and an opposing second triangle face plate 22. The two triangular plates 20 and 22 are maintained in spaced relation by rectangular side plates 24 and 26, and rectangular base plates 28, 30, which, together, define the edges of the triangular body of earth separating member 18. The base plate may be formed from two separate plates 28 and 30 joined to opposite sides of the shaft 12, e.g., by welding, or may be a single plate with a saddle fitting adapted for attachment to the lower end of the shaft 12.

The sidewalls 24 and 26 and the base plates 28, 30 all have a pre-determined width, preferably of 1¼". The two sidewalls 22 and 24 are the same length as two sides of each triangle face plate 20 and 22, and are preferably equal in length to each other, the triangular plates 20 and 22 each defining an isosceles triangle. The rectangle base plate 28, 30 is the length of the third side of each triangle face plate 20 and 22, forming the base of the isosceles triangle. All plates are secured together at the plate edges, e.g., by welding, to form a hollow, triangular body.

Representative dimensions of the planting tool 10 include a 29" shaft 12, a 15" handle bar 14, 16, an 8" rectangular base plate 28, 30 and 9" rectangle side wall plates 24, 26. The width of each wall plate and base plate is 1¼. Each triangle face plate has two 9" sides and one 8" side.

Referring now to FIG. 1, the planting tool 10 is used when the ground is already prepared for receiving annual plugs. Preparation requires that the ground be aerated and tilled. Once the soil is prepared, the user takes the planting tool 10 and drops it in the ground to create a 1¼" wide V-shaped opening 32. The benefit of creating a 1¼" V-shaped opening is that the average size of an annual plug is about 1¼". When needed, the user can exert hand pressure and foot pressure on the tool. Foot pressure can be asserted on the tool by placing the user's foot on the base wall 28 or 30 of the earth separating member 18.

The planting tool 10 can also be used to create a conical hole 34 in the ground, as seen in FIG. 3. A conical hole is advantageous for pots or for larger plant life. The conical hole is created by dropping the planting tool 10 in the prepared ground and then twisting or turning the tool 10 in a circular motion.

It is to be understood that the present invention is not limited to the embodiment described above, but encompasses any and all embodiments within the scope of the following claims.

I claim:

1. A planting tool, comprising:
   an elongated shaft having an upper end and a lower end;
   a handlebar secured to the upper end of said shaft, said handlebar being normal to and bisected by said shaft; and
   a hollow triangular body defining an earth separating member, said triangular body including:
   a rectangular base plate having a width and including first and second ends and opposite sides, said base plate being attached to and bisected by the lower end of said shaft;
   two rectangular side plates of equal length and having a width equal to the width of said base plate, each of said side plates having a top end depending from each of the first and second ends of said base plate and a bottom end joined at an apex to form a triangular configuration along peripheral edges of said base plate and said side plates; and
   two triangular face plates, each of said face plates being dimensioned and configured to correspond to the triangular configuration formed by said base plate and said side plates, each of said face plates being perpendicularly attached to said base plate and said side plates along the peripheral edges;

whereby, the planting tool may be grasped by the handlebar and the earth separating member driven into a planting medium in order to define a V-shaped planting hole for receiving an annual plug.

2. The planting tool according to claim 1, wherein said base plate and said side plates each has a width of about one and one quarter inches.

3. The planting tool according to claim 1, wherein said base plate has a length of about eight inches and the length of each of said side plates is about nine inches.

4. The planting tool according to claim 1, further comprising rubber grips disposed on said handlebar.

5. The planting tool according to claim 1, wherein said shaft is hollow.

6. The planting tool according to claim 1, wherein said shaft, said handlebar and said earth separating member are made from steel.

* * * * *